Oct. 13, 1964   J. G. BENETTI   3,152,412
SUPPORT FOR TRENCHER TOOTH
Filed Dec. 4, 1961   2 Sheets-Sheet 1

INVENTOR.
JOHN G. BENETTI
BY
ATTORNEY

Oct. 13, 1964   J. G. BENETTI   3,152,412
SUPPORT FOR TRENCHER TOOTH
Filed Dec. 4, 1961   2 Sheets-Sheet 2

INVENTOR.
JOHN G. BENETTI
BY Julian Caplan
ATTORNEY

United States Patent Office 3,152,412
Patented Oct. 13, 1964

3,152,412
SUPPORT FOR TRENCHER TOOTH
John G. Benetti, Cupertino, Calif., assignor, by direct and mesne assignments, of one-half to Gerald A. Petersen, Santa Clara, and one-half to Anita E. Petersen, Saratoga, Calif.
Filed Dec. 4, 1961, Ser. No. 156,907
3 Claims. (Cl. 37—191)

This invention relates to new and improved support for trencher tooth. More particularly, the invention relates to a means for attachment of a tooth holder to the chain of a chain-type trenching machine.

A common type trenching machine comprises a boom which serves as a guide for a continuous chain of the roller type, the chain being provided at intervals with teeth carried thereby. In accordance with the present invention, the teeth are replaceable and hence are received and retained in holders, which holders are connected to the chain by supports. In a common chain-type trenching machine the teeth are arranged in series whereby the first tooth in the series is centrally located, subsequent teeth are laterally outwardly slanted and the last teeth in the series are arranged in pairs in dual holders whereby one tooth of each pair is disposed on each side of the chain. The advantage of the above-described arrangement of the teeth is that the cut begins at the center in a width equal to the width of one tooth and then widens out as the chain progresses, thereby facilitating the digging operation. It is a feature and advantage of the present invention that the tooth holding means for all of the foregoing lateral spacings of teeth may be supported by the chain in substantially the same manner.

The principal feature of the present invention is the fact that the holder divides the strain imposed on the chain by the digging action on two links rather than on a single link. The back pressure on the tooth-holder is absorbed partially by an upward lift on the link of the chain to which the holder is primarily attached and a downward pressure on a link to the rear thereof.

Among the advantages of the foregoing arrangement is the fact that the pressure is applied at two points rather than at a single point, and hence the strain tending to wear or break the chain is correspondingly reduced.

A still further feature of the invention is the fact that the tooth is held more securely and is retained more securely in proper digging position.

A still further advantage of the invention is the fact that the foregoing features contribute to a longer life of the chain, easier operation of the trenching machine and a more rapid digging action.

Other objects of the present invention will become apparent upon reading the following specification and referring to the accompanying drawings in which similar characters of reference represent corresponding parts in each of the several views.

Figure 1:
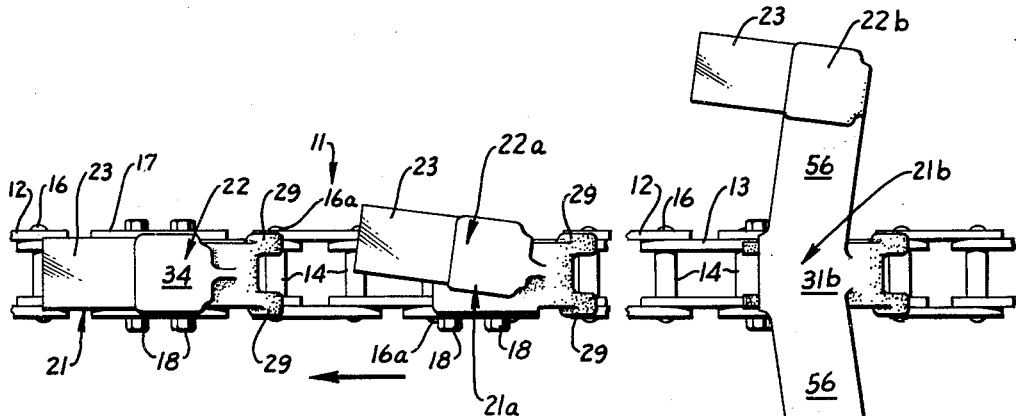
FIG. 1 is a fragmentary plan view of a portion of the chain of a trenching machine showing a plurality of holders for teeth and the teeth installed therein.

The chain 11 with which the present invention is used may be of the conventional roller type. Such a chain has short longitudinally extending outer and inner links 12 and 13, respectively, arranged in pairs on opposite sides thereof. Each inner link 13 is disposed inwardly and the next outer link 12 partially overlaps the inner link and is parallel thereto. Positioned between the inner links 13 and spacing the same apart are rollers 14. Pins 16 with enlarged heads extend through the outer links 12, through the inner links 13 and through the rollers 14, thereby passing from side to side of chain 11. At spaced intervals along the length of chain 11 are connecting links 17 which, in the form shown in FIG. 1 of the accompanying drawings, comprise substantially rectangular plates having a length equal to the length of outer links 12 and having a width approximately twice the width of links 12. A pair of connecting links 17 replaces one pair of outer links 12 at intervals. A pair of holes is formed in each connecting link to receive pins 16a which connect links 17 to the chain 11 and also with laterally offset holes to receive transversely extending bolts 18 which together with nuts 19 hold the support 21 to the connecting link 17.

Support 21, which is the subject of the present invention, has at its outer end a tooth holder 22 holding replaceable tooth 23. In end elevation (FIG. 3) support 21 is substantially U-shaped. The legs 26 of the holder are spaced apart about the same distance as the inner links 13 of chain 11 and diverge slightly inwardly and are formed with apertures to receive bolts 18. A spreader 27 extends across the legs intermediate bolts 18 to prevent inward distortion of legs 26 when bolts 18 are tightened. The length of the base of each leg 26 is approximately twice the length of each link 12 or 13 and, in any event, substantially greater than the length of one such link. A pad 29 spreading outward is formed at the rearward end of the base of each leg to distribute the load partially to outer link 12a following connecting link 17. Pad 29 is preferably located substantially opposite the pin 16a at the forward end of link 12a. Legs 26 at their outer ends are interconnected by transverse web 31 which is slanted forwardly-outwardly so that tooth 23 assumes the proper acute cutting angle with respect to chain 11. The tooth-holding means located on web 31 shown herein resembles that illustrated in Patent No. 2,968,880. This portion of the tooth-holder may be defined as essentially H-shaped in the sense that it is formed with a vertical web 32 extending between transverse member 33 which comprises a thickening and reinforcement of web 31 and spaced transverse member 34 which merges rearwardly into member 33 and is reinforced at the rear by gusset 36. Thus, a recess for the tooth is provided having walls 37, 38 at the bottom and top, respectively (as viewed in the working position of the tooth in FIGS. 2 and 3), which are parallel and having transverse walls 39 on either side of web 32. The recess receives tooth 23 as hereinafter set forth. Extending transversely horizontally through web 32 is a hole 41 which receives a resilient insert 42 formed of rubber, neoprene, or the like, and which is preferably circular in cross-section. The length of insert 42 is substantially greater than the width of web 32. In order to allow the insert to bend backwardly, grooves 43 are formed in walls 39 rearwardly of hole 41, grooves 43 being preferably semicircular in cross-section and having a radius approximately equal to the radius of insert 42. It will be observed that at the rearward end of holder 22 there are rearward facing openings 44 on either side which provide access to the recess. A tool may be inserted into openings 44 and used to force tooth 23 forwardly and out of holder 22 against the restraining power of resilient insert 42 which tends to retain the tooth in the holder.

The tooth 23 which is herein illustrated is also similar to that shown in Patent No. 2,968,880. Essentially, it consists of tapered distal faces 46 having cutting edges 47 which are reversible in the sense that the tapered top and bottom distal faces 46 are truncated at the front edge. Rearwardly of top and bottom faces 46 are proximal prongs 48 or roots on either side of the tooth separated from each other by a rectangular slot 49 which extends forwardly from the proximal end of the tooth. The width of slot 49 is approximately equal to the distance between walls 39. Vertical side walls 51 are formed defining the sides of slot 49 and it is against these walls that resilient insert 42 presses to hold the tooth in its holder. The spacing between walls 37, 38 of holder 22 accommodates the thickness of prongs 48. To assist in holding tooth 23 in alignment relative to holder 22, a notch 52 may be formed forwardly of slot 49 having a width equal to approximately one-half the width of slot 49. Correspondingly, web 32 is formed with a reduced width portion 53 forwardly of hole 41, which reduced width portion 53, fits into notch 52. The foregoing construction prevents the strains imposed on the tooth from skewing the tooth out of proper alignment.

Notches 54 may be formed extending transversely across top and bottom surfaces of prongs 48. Reference is made to Patents No. 2,877,574 and No. 2,952,085 for means for securing teeth thus constructed to a holder by means other than those illustrated herein.

As has heretofore been explained, a common type trenching machine employs teeth 23 arranged in series. Thus, the forwardmost tooth 23 of each series is centrally disposed and its support 21 carries holder 22 which has a width approximately equal to the width of tooth 23 and is aligned with chain 11. The next support 21a in the series has a holder 22a slanted forwardly-outwardly to one side, but is in other respects similar to the holder 22 illustrated in FIGS. 2 to 5. The next support in the series (not shown) is similar to support 21a, but its holder is slanted toward the opposite side of the chain. A following support 21b may hold a pair of teeth 23. Thus, the web 31b is formed with laterally extending wings 56 on either side thereof and on each wing is a holder 22b substantially similar to holder 22a. The spacing between holders 22b may be small in the case of the first dual support 21b in the series and then increase to the maximum width of the cut of the trenching machine at a later holder in the series.

Figure 2:
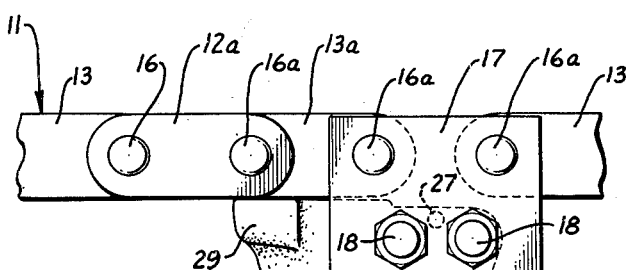
FIG. 2 is an enlarged fragmentary side elevation of a portion of FIG. 1.
Figure 3:
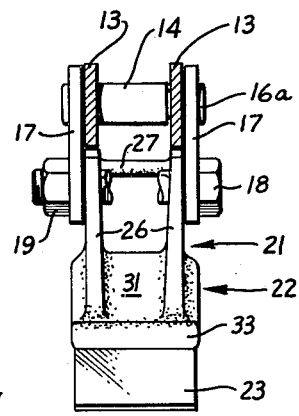
FIG. 3 is an end elevation of the structure of FIG. 2.
Figure 4:
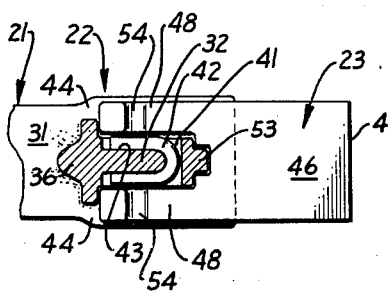
FIG. 4 is a fragmentary sectional view taken substantially along the line 4—4 of FIG. 2.
Figure 5:
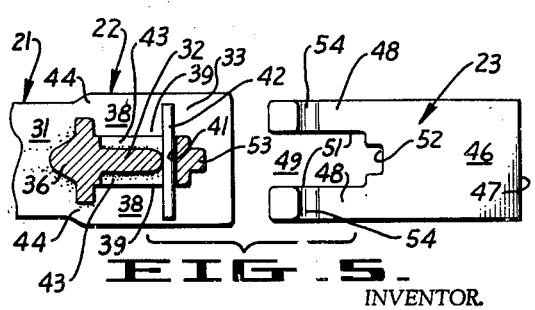
FIG. 5 is an exploded view, showing the structure of FIG. 4 prior to assembly of the tooth in its holder.

Directing attention now to FIG. 2, it will be seen that the force of the cutting action applied to tooth 23 may be indicated by arrow 55 and support 21 distributes the strain over a portion of the chain 11 greater than the length of one link 12, 13. Thus, the force 55 acting on tooth 23 during digging tends to impose a strain on link 17, tending to lift link 17 away from a straight line along the center lines of pins 16, 16a and, at the same time, the tooth imposes downward pressure against pin 16a and rearward links 13a and 12a. Thus, the pressure is divided by distributing it at several locations rather than one and applying it partly as an inward and partly as an outward force and this holds tooth 23 more firmly relative to chain 11 and more precisely at the correct digging angle.

Figure 6:
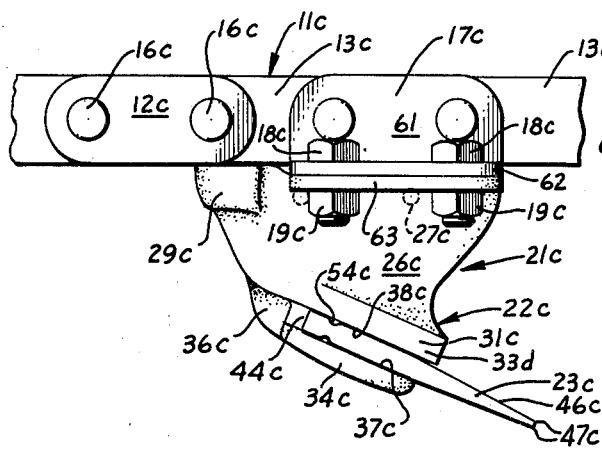
FIG. 6 is a view similar to FIG. 2 of a modification.
Figure 7:
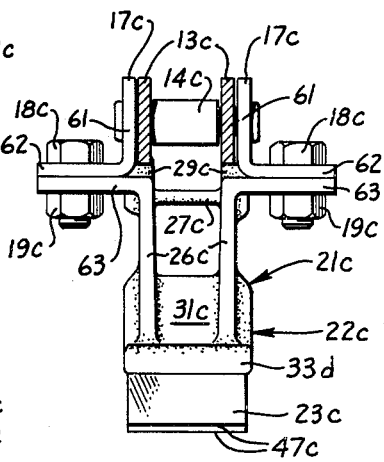
FIG. 7 is an end elevation of the modification of FIG. 6.

FIGS. 6 and 7 show the invention applied to a modified chain 11c structure. Each connecting link 17c is angular in end elevation, comprising a flange 61, which is essentially of the same dimensions as outer links 12, and an outwardly directed flange 62 extending at a right angle to flange 61.

The holder 21c has outwardly directed feet 63 at the bottom edges of legs 26c, which feet 63 are dimensioned approximately the same as flanges 62. Flanges 62 and feet 63 are formed with aligned holes to receive bolts 18c which secure holder 21c to the chain. In other respects the various elements of the modification of FIG. 6 are similar to those of FIG. 1 and corresponding parts are shown in the accompanying drawings followed by the subscript c.

Figure 8:
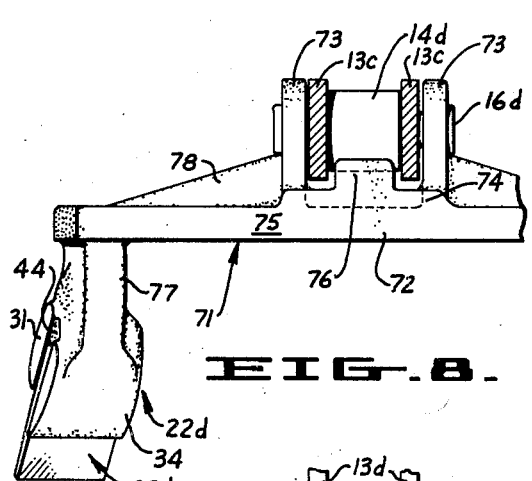
FIG. 8 is an end elevation of another modification, partly broken away in section.
Figure 9:
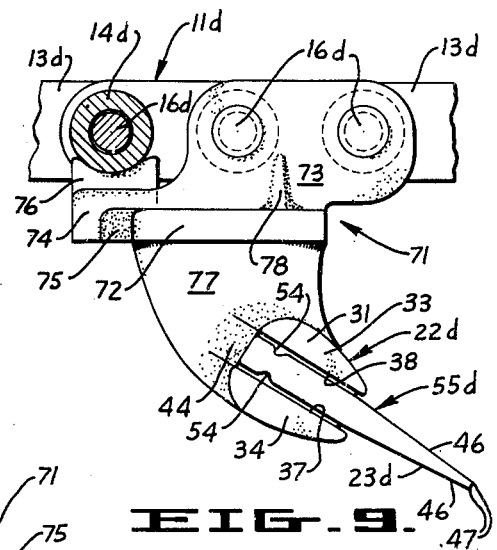
FIG. 9 is a side elevation of the structure of FIG. 8.
Figure 10:
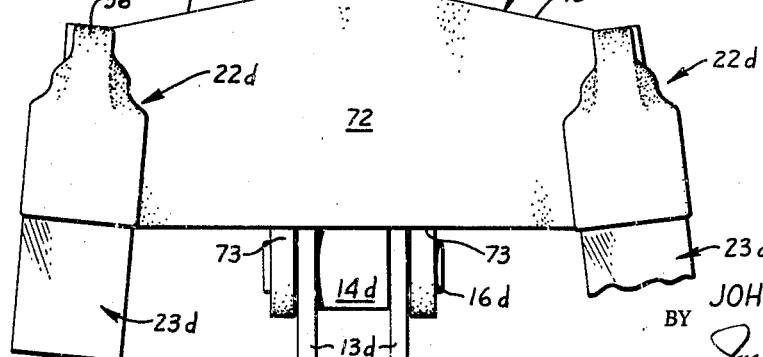
FIG. 10 is a bottom plan of the structure of FIG. 8.

Turning now to FIGS. 8 to 10, the tooth support 71 there shown is preferably directly connected into chain 11d rather than being attached to a connecting link in the chain. This modification is most conveniently used with that type roller chain wherein the connecting pins 16d between links are detachably inserted rather than being rivetted or otherwise permanently secured in place. Support 71 comprises a horizontal table 72 which is generally parallel to but spaced from chain 11d, and has legs 73 projecting therefrom which are spaced apart the same distance as outside links 12d. Table 72 is generally rectangular in plan having slightly outwardly flared rear edges 75. Legs 73 are apertured to receive pins 16d in the same manner as links 12d in the chain.

Extending transversely on the underside of table 72 one link rearwardly is a boss 74 having a central concave pad 76 which bears against roller 14d one length to the rear of the rearmost pin 16d connecting legs 73 to the chain.

Table 72 carries one or more tooth holders 22d supported on stems 77. In the accompanying drawing two holders 22d supported by stems 77 on opposite sides of table 72 are shown, this being a preferred arrangement. Gussets 78 support the outside edges of table 72 from legs 73. Holders 22d and teeth 23d are essentially the same and are held together in the same manner as in the previous modifications.

In this modification, it will be seen that force 55d applied to tooth 23d is distributed over at least two links in the chain. Thus, the force 55d imposes a lifting force on legs 73 and an inward pressure transmitted by pad 76 against the roller 14d with which it is in contact.

Although the foregoing invention has been described in some detail, by way of illustration and example for purposes of clarity of understanding it is understood that certain changes and modifications may be practiced within the spirit of the invention and scope of the appended claims.

What is claimed is:

1. For use with a trenching machine the combination comprising an endless chain having a plurality of pairs of first links, a plurality of pairs of second links displaced outwardly and also longitudinally of some of said first links, a plurality of pairs of connecting links displaced outwardly and also longitudinally of the other of said first links, adjacent links overlapping, rollers between opposite ends of said first links, first pins each passing through overlapped ends of a pair of second links and of a pair of first links and a roller, second pins passing through overlapped ends of a pair of connecting links and of a pair of first links and a roller, at least a portion of each said connecting link lying in a common plane with corresponding second links on the same side of the chain, each said connecting link being shaped coextensively with the shape of one second link plus an extension, said extension lying outside the boundaries of a zone, in a straight stretch of chain, defined by the plane of the outer faces of said second links and the longitudinal edges of said second links, said extensions formed with first holes, and a tooth support substantially U-shaped in transverse cross-section having parallel legs spaced apart less than the distance between said portions of said connecting links and substantially the same distance as said first links, said legs formed with second holes matching with said first holes, a connecting web interconnecting the ends of said legs opposite said second holes, tooth-receiving means on said web, shaped and positioned to receive a portion of a forward-pointing tooth, bolts passing through said first and second holes to fasten said tooth support to a pair of connecting links connected to two consecutive second pins, said legs extending rearward to a position over a first pin immediately rearward of said two consecutive second pins, and pads on said legs overlapping said last-mentioned first pin and having a transverse width to contact both the first link and the second link through which said last mentioned first pin passes, whereby stress imposed by a tooth on said tooth receiving means is distributed to said two consecutive second pins, said last mentioned first pin and to all the links through which said last mentioned three pins pass.

2. The combination of claim 1 in which each said connecting link is in the shape of a flat plate and said first holes are displaced in the direction of said support relative to a plane joining the axes of all said pins in a straight stretch of chain, said legs fitting inside and substantially parallel to said connecting links.

3. The combination according to claim 1, which further comprises a spreader extending between and interconnecting said legs intermediate said second pins connecting said connecting links to said chain.

References Cited in the file of this patent

UNITED STATES PATENTS

| | | |
|---|---|---|
| 945,335 | Levin | Jan. 4, 1910 |
| 1,244,785 | Sessions | Oct. 30, 1917 |
| 2,636,291 | Reagle | Apr. 28, 1953 |
| 2,666,273 | McIninch | Jan. 19, 1954 |
| 2,720,717 | Arps | Oct. 18, 1955 |
| 2,780,014 | Arps | Feb. 5, 1957 |
| 2,968,880 | Petersen | Jan. 24, 1961 |
| 3,022,588 | Brown | Feb. 27, 1962 |
| 3,049,824 | McIninch | Aug. 21, 1962 |